US011341753B2

(12) United States Patent
Asvatha Narayanan et al.

(10) Patent No.: US 11,341,753 B2
(45) Date of Patent: May 24, 2022

(54) EMERGENCY VEHICLE DETECTION

(71) Applicant: Continental Automotive GmbH, Hannover (DE)

(72) Inventors: Vishnu Vardhana Asvatha Narayanan, Singapore (SG); Sreekanth Velladath, Singapore (SG); Sriram Natarajan, Singapore (SG); Sri Hari Bhupala Haribhakta, Singapore (SG); Elias Strigel, Singapore (SG); Martin Pfitzer, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 187 days.

(21) Appl. No.: 16/591,818

(22) Filed: Oct. 3, 2019

(65) Prior Publication Data

US 2020/0110949 A1   Apr. 9, 2020

(30) Foreign Application Priority Data

Oct. 5, 2018   (GB) ..................... 1816230

(51) Int. Cl.
*G06K 9/00* (2022.01)
*G06K 9/46* (2006.01)
(Continued)

(52) U.S. Cl.
CPC ............ *G06V 20/584* (2022.01); *G06V 10/56* (2022.01); *G08G 1/015* (2013.01); *G08G 1/017* (2013.01); *G08G 1/04* (2013.01); *G08G 1/0965* (2013.01)

(58) Field of Classification Search
CPC .. G06K 9/00825; G06K 9/4652; G06K 9/522; G08G 1/015; G08G 1/017; G08G 1/04; G08G 1/0965
See application file for complete search history.

(56) References Cited

U.S. PATENT DOCUMENTS 6,734,787 B2   5/2004 Ikeda
9,576,208 B2 *   2/2017 Agnew ............... G06V 20/584
(Continued)

FOREIGN PATENT DOCUMENTS

CN   106971196 A   7/2017
CN   107248245 A   10/2017
(Continued)

OTHER PUBLICATIONS

Frohlich, B., et al., "Will this car change the lane?—Turn signal recognition in the frequency domain," Jun. 8-14, 2014, pp. 37-42, XP032620313, 2014 IEEE Intelligent Vehicles Symposium (IV), [retrieved on Jul. 15, 2014].
(Continued)

*Primary Examiner* — Sisay Yacob
(74) *Attorney, Agent, or Firm* — RatnerPrestia

(57) ABSTRACT

A method for detecting the presence of an emergency vehicle includes receiving a plurality of image frames over a period of time, determining an EV colour component for each image frame based on the ratio of a first colour relative to the total colour in each pixel and assigning to a pixel a first value if the EV colour component exceeds a predefined threshold value and a second value if the EV colour component does not, and determining for an EV colour value for the first colour based on the sum of all of the first values for each image frame. The method also includes generating a time domain representation, converting the time domain representation for the plurality of image frames to a frequency spectrum, and determining if any flashing light sources of the first colour associated with one or more types of emergency vehicles is present.

18 Claims, 5 Drawing Sheets

(51) Int. Cl.
*G08G 1/0965* (2006.01)
*G06V 20/58* (2022.01)
*G08G 1/015* (2006.01)
*G08G 1/017* (2006.01)
*G08G 1/04* (2006.01)
*G06V 10/56* (2022.01)

(56) References Cited

U.S. PATENT DOCUMENTS

| | | | |
|---|---|---|---|
| 9,766,628 | B1 | 9/2017 | Lo et al. |
| 10,856,389 | B2 | 12/2020 | Zhang |
| 2012/0136559 | A1* | 5/2012 | Rothschild ....... G08G 1/096716 701/117 |
| 2016/0025905 | A1 | 1/2016 | Teather et al. |
| 2016/0252905 | A1* | 9/2016 | Tian ..................... G06V 20/584 701/23 |
| 2018/0048801 | A1 | 2/2018 | Kiser et al. |
| 2018/0233047 | A1 | 8/2018 | Mandeville-Clarke |
| 2019/0283657 | A1 | 9/2019 | Gao |

FOREIGN PATENT DOCUMENTS

| | | |
|---|---|---|
| CN | 107420844 A | 12/2017 |
| CN | 107734318 A | 2/2018 |
| JP | 2002319091 A | 10/2002 |
| JP | 2012023459 A | 2/2012 |
| JP | 201226255 A | 12/2015 |
| JP | 2016005234 A | 1/2016 |
| JP | 2018013386 A | 1/2018 |
| WO | 2018201349 A1 | 11/2018 |

OTHER PUBLICATIONS

Cabani, I., et al., "Color-based detection of vehicle lights," Intelligent Vehicles Symposium, 2005 Proceedings, IEEE Las Vegas, NV, Jun. 6-8, 2005, pp. 278-283, Piscataway, NJ, IEEE, XP010834135.
Notice of Reasons for Refusal for Japanese Application No. 2019-179627, dated Sep. 11, 2020, with translation, 4 pages.
Chinese Office Action for Chinese Application No. 201910948900.1, dated Nov. 24, 2020, with English language summary, 10 pages.
Extended European Search Report for European Application No. 19 201 401.7, dated Feb. 28, 2020, 12 pages.
Great Britain Search Report for Great Britain Application No. GB1816230.5, dated Mar. 19, 2019, 3 pages.
Chinese Office Action for Chinese Application No. 201910948900.1, dated Aug. 4, 2021, with translation, 11 pages.
Japanese Decision to Grant a Patent for Japanese Application No. 2019-179627, dated Jul. 1, 2021, with translation, 5 pages.

* cited by examiner

EMERGENCY VEHICLE DETECTION

CROSS REFERENCE TO RELATED APPLICATIONS

This application claims priority to Great Britain Patent Application No. 1816230.5, filed Oct. 5, 2018, the contents of such application being incorporated by reference herein.

FIELD OF THE INVENTION

The present disclosure relates to methods and apparatus for detecting the presence of emergency vehicles via image analysis.

BACKGROUND OF THE INVENTION

Modern vehicles are frequently equipped with various electronic systems intended to assist a driver in the driving of a vehicle. Such driver assistance systems often include environment sensors such as image, radar and lidar sensors which are operable to collect information about an external environment of the vehicle. The environment sensors may be mounted on the vehicle itself or located remotely with sensor data being transmitted to the vehicle wirelessly. Data collected by the sensors is then analysed by one or more processors and used to provide various driving assistance functions which may range from providing driver notifications/warning, semi to fully autonomous manoeuvring of the vehicle.

In some instances, driver assistance systems may be used to detect for the presence of approaching emergency vehicles (EV) such as ambulances, fire engines and police cars so that a driver or autonomous driving modules of the vehicle may take appropriate action such as yielding to the vehicle. The detection of emergency vehicles may be achieved by analysing images of the vehicle environment taken by an image sensor alone or in combination with other sensor data. Accordingly, there is a demand for image-based methods and device for detecting the presence of emergency vehicles which are efficient that that appropriate actions may be promptly taken.

SUMMARY OF THE INVENTION

Aspects of this disclosure provide methods and device for detecting the presence of emergency vehicles from a plurality of image frames taken by an image sensor over a period of time.

One aspect of this disclosure provides a method for detecting the presence of emergency vehicles comprising receiving a plurality of image frames taken by an image sensor over a period of time. By way of example, the image sensor may be mounted externally on a vehicle and configured to capture images of an external environment of the vehicle. The image sensor may be a mono-camera or a wide angle fisheye camera. In some implementations, the image sensor may be mounted on the rear of a vehicle and configured to continuously capture images in a rearward direction of the vehicle. A computing processor may be configured to analyse image frames taken by the image sensor so as to determine if there are any emergency vehicles in the rearward direction of the vehicle. In other implementations, the image sensor may also be mounted on an infrastructure such as a lamp-post and image frames captured sent to a processor for processing. The analysis of the image frames comprises determining an emergency vehicle (EV) colour component for a plurality of pixels in each image frame based on the ratio of a first colour relative to the total colour in each pixel and assigning to a pixel a first value if the EV colour component exceeds a predefined threshold value and a second value if the EV colour component does not. The first colour corresponds to the colour of flashing light sources belonging to one or more types emergency vehicles of interest. For example, the first colour may be blue, yellow or any other colour associated with an emergency vehicle. The EV colour component measures the content of the first colour in each pixel relative to the total colour in each pixel. In some implementations, the first value or second value assigned to a pixel may be 1 and 0 respectively The method may also further comprise removing spurious spikes using a median filter after determining the EV colour component for the plurality of pixels in each of the plurality of image frames and before determining the EV colour value. Other values may also be suitable so long as the first and second values are different. Preferably, the EV colour component is computed for all the pixels in an image frame. An EV colour value for each of the plurality of image frames is then determined based on the sum of all the first values for each image frame. The EV colour value gives an indication of the colour intensity for a chosen first colour being analysed in a given frame. A time domain representation based on the EV colour values associated with the image frames is generated followed by a conversion of the time domain representation for the plurality of image frames to a frequency spectrum. The frequency spectrum may be, for example, be represented as a variation in power spectral density (PSD) versus frequency or a normalized frequency spectrum which shows the relative contribution of a frequency component with respect to all the frequency components in a signal may also be generated instead. The frequency spectrum is analysed to determine if there are any flashing light sources of the first colour associated with one or more types of emergency vehicles present in the plurality of image frames.

Implementations of this disclosure according to the above method may bring about several advantages. Firstly, the method does not require complex computational processes which accordingly reduces computational demands and processing time. For instance, methods for detecting flashing light sources of emergency vehicle according to implementations of this disclosure do not require identification of specific light sources within an image frame. Such identification imposes additional processing demands compared to the current method as image frames have to be analysed and light sources specifically identified based on templates of known flashing light sources belonging to emergency vehicles stored in a database. The templates may include information such as colour and spatial configuration of known emergency vehicle light sources. Implementations of this disclosure also do not require the flashing rate of each specifically identified potential light source to be individually checked for correspondence with the flashing rate of known emergency vehicles stored in the database. Instead, the EV colour value of each of a plurality of image frames taken by an image sensor over a period of time is computed and a frequency spectrum derived therefrom is used to identify if there are any light sources of a first colour with a flashing rate associated with one or more types of emergency vehicles. Further, implementations of this disclosure are not only capable of detecting emergency vehicles based on light sources which are directly visible to an image sensor but also based on reflections of such light sources off different surfaces such as road and glass surfaces and vehicle body. This is because implementations of this disclosure do not require specific matching of light sources detected in images with those of known emergency vehicles. The latter scenario is useful when an emergency vehicle light source is occluded.

In some implementations, generating the time domain representation of the plurality of image frames may further comprise removing any direct current (d.c.) bias in the EV colour values. This may be achieved by calculating the average EV colour value for all the image frames and deducting it from the individual EV colour values of each frame. As for converting the time domain representation to a frequency spectrum, algorithms such as Fourier transform and wavelet transform may be used. In a preferred implementation, fast Fourier transform is used to convert the time domain representation to the frequency spectrum. Fast Fourier transform is generally faster compared to discrete Fourier transformation and gives the same results. Relatively fewer data points are also required to obtain a smooth frequency response. The conversion process may also be configured to render a one frequency sided spectrum. Since this disclosure only requires the absolute value of signals in the frequency spectrum to detect flashing light sources, one-sided spectrums advantageously eliminate redundant computations associated with two sided spectrums because both sides of the spectrum have the same requisite information. Additionally, the elimination of redundant computations also allows more relevant sampling points to be processed without incurring additional computational resources. By way of example, the conversion to a one-sided frequency spectrum may be carried out using the known pwelch function in the MATLAB™ software.

In another exemplary implementation, analysing the frequency spectrum may comprise determining if frequency components present in the frequency spectrum matches frequency components of known first colour light sources belonging to one or more types of emergency vehicles. In one variation, a frequency component may be considered as present if it has an amplitude greater than or equal to a predefined minimum amplitude. By way of example, the frequency components present in the frequency spectrum are considered as matching frequency components of a known first colour light source associated with one or more types of emergency vehicles if at least the fundamental frequency and one or more other harmonics match. The one or more harmonics chosen as being representative of a first colour light source depends various factors such as image sensor quality, frame rate of incoming image frames being processed, or a combination thereof. In an optional implementation, the method may further comprise causing one or more actions to be executed based at least in part upon determining that at least one light source associated with a particular type of emergency vehicle is present. By way of example, the one or more actions may include determining a location of one or more emergency vehicles detected to be present.

Implementations of this disclosure may also be in the form of a non-transitory computer-readable storage medium comprising computer-readable instructions for carrying out the aforementioned methods.

Another aspect of the disclosure provides a device for detecting the presence of emergency vehicles comprising a processor and at least one memory coupled to the processor. The at least one memory stores instructions executable by the processor causing the processor to receive a plurality of image frames taken by an image sensor over a period of time, determine an EV colour component for a plurality of pixels in each image frame based on the ratio of a first colour relative to the total colour in each pixel and assign to a pixel a first value if the EV colour component exceeds a predefined threshold value and a second value if the EV colour component does not. The processor is further caused to generate a time domain representation based on the EV colour values associated with the plurality of image frames, convert the time domain representation for the plurality of image frames to a frequency spectrum and determine if any flashing light sources of the first colour associated with one or more types of emergency vehicles is present by analysing the frequency spectrum. A vehicle comprising a device in accordance with this disclosure may also be implemented. In some implementations, the first value may be 1 and the second value 0.

In some variations, analysis of the frequency spectrum by the processor comprises determining if frequency components present in the frequency spectrum matches frequency components of known first colour light sources associated with one or more types of emergency vehicles. For instance, the frequency components present in the frequency spectrum may be considered as matching frequency components of a known first colour light source associated with one or more types of emergency vehicles if at least the fundamental frequency and one or more harmonics match.

The at least one memory may also further cause to processor to cause one or more actions to be executed at least in part upon determining that at least one light source associated with a particular type of emergency vehicle is present. By way of example, the one or more actions may include issuing a notification to a driver of the vehicle that there is an emergency vehicle in the vicinity and/or instructing a telematics module to send signals to other vehicles alerting them about the presence of the emergency vehicle.

The details of one or more implementations of the disclosure are set forth in the accompanying drawings and the description below. Other aspects, features, and advantages will be apparent from the description and drawings, and from the claims.

DETAILED DESCRIPTION OF THE PREFERRED EMBODIMENTS

In the following detailed description, reference is made to the accompanying figures. In the figures, similar symbols typically identify similar components, unless context dictates otherwise.

Figure 1:
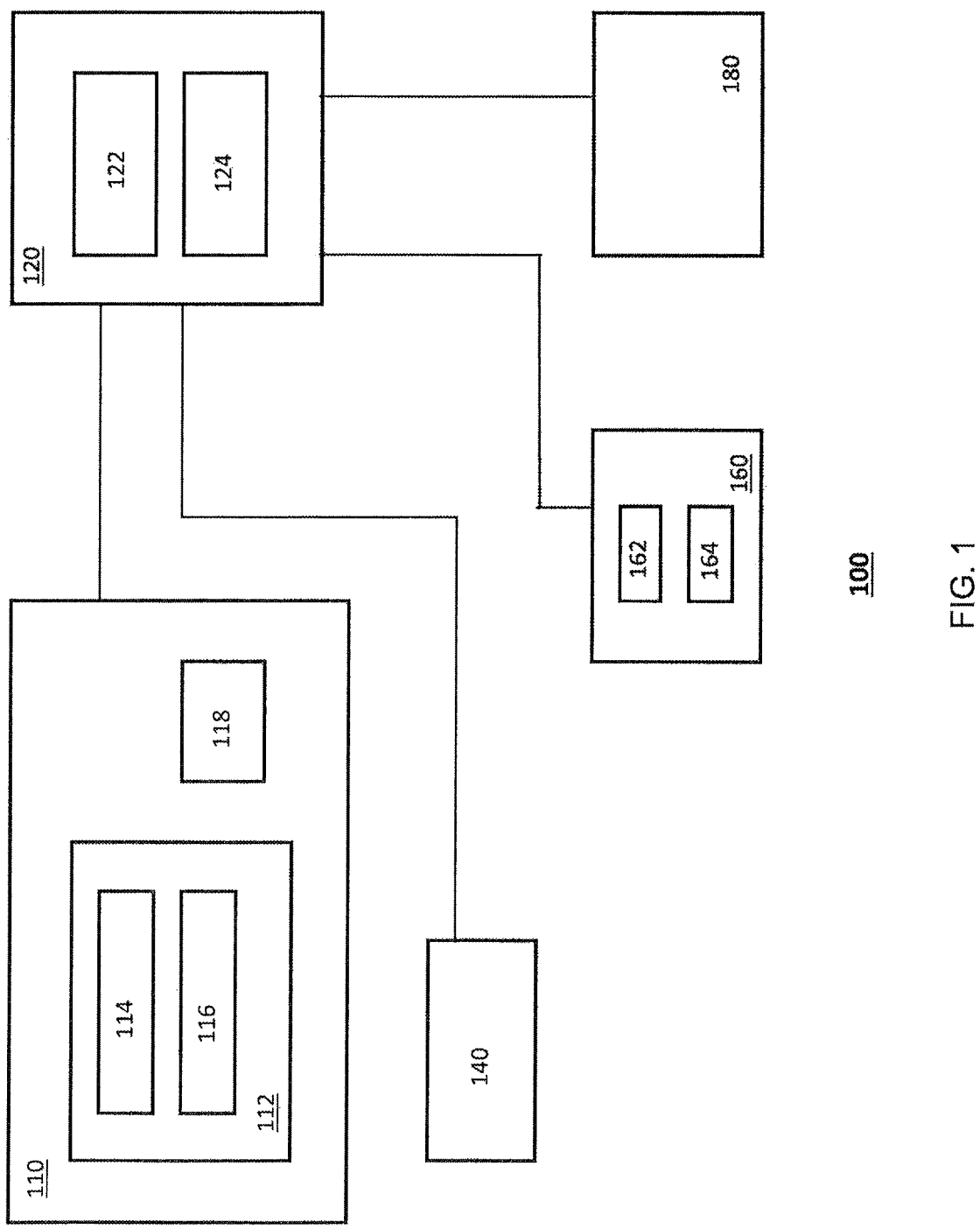
FIG. 1 is a functional block diagram of a system 100 comprising a machine vision module for detecting the presence of emergency vehicles according to one implementation of this disclosure.
Figure 2:
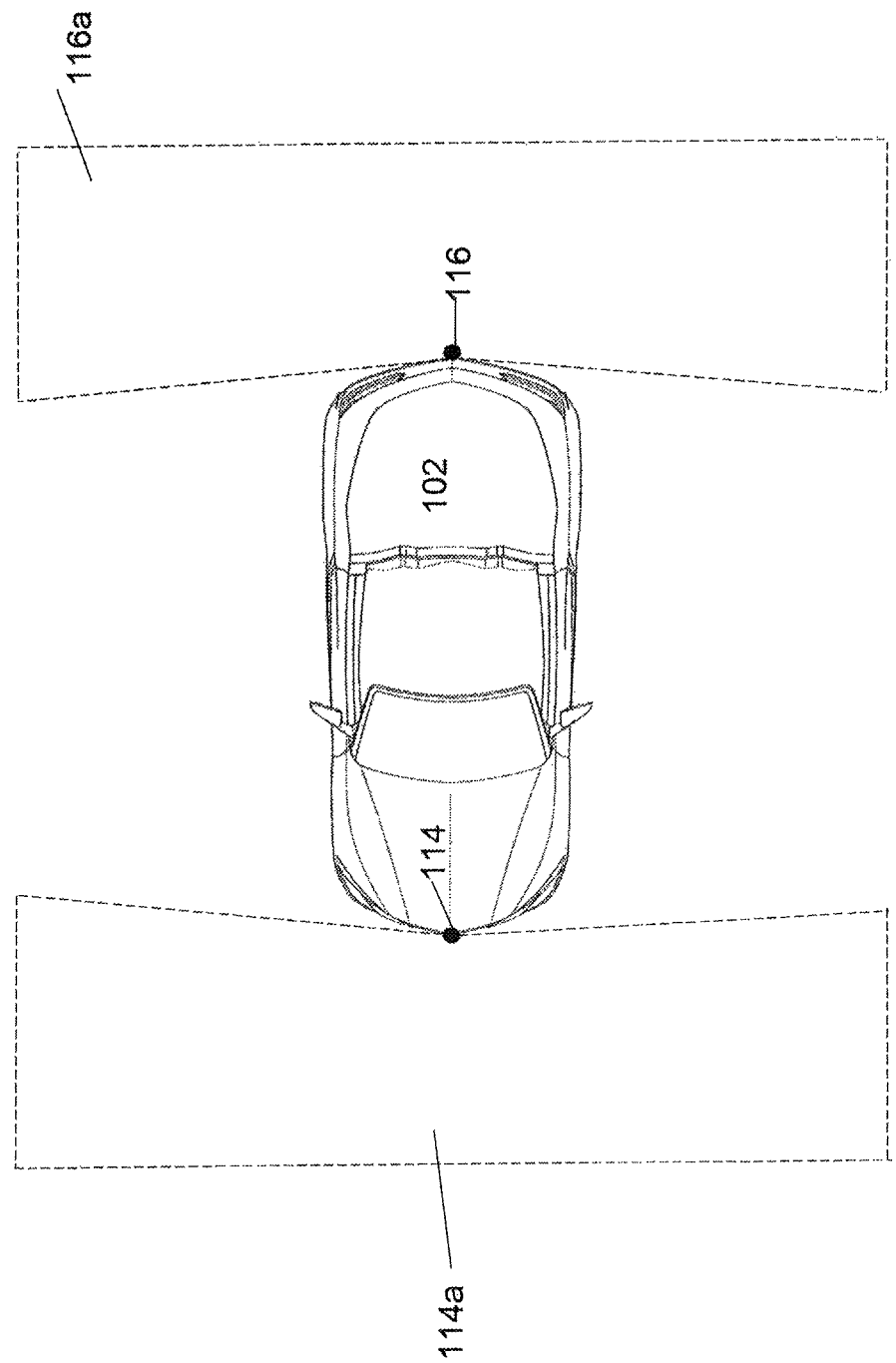
FIG. 2 is an exemplary schematic diagram illustrating a car mounted with multiple image sensors and corresponding field of view associated with each image sensor.

FIG. 1 is a functional block diagram of an exemplary system 100 associated with a vehicle comprising an environment module 110, a machine vision module 120, an autonomous driving module 140, a user interface 160 and a telematics module 180 according to one implementation of this disclosure. The environment module 110 comprises environment sensors operative to sense and collect information about an external environment of the vehicle. In the FIG. 1 implementation, the environment module comprises an image sensor module 112 including two image sensors (114 and 116) mounted externally at different parts of the vehicle. The image sensors being operable to capture images of an external environment of the vehicle. The image sensors may continuously capture images of the external environment so long as the vehicle ignition is switched on or capture images on demand basis. FIG. 2 shows an exemplary implementation where the two image sensors (114, 116) are mounted at the front and rear of the vehicle 102 respectively. The image sensors (114, 116) may, for example, be vision image sensors such as mono cameras or wide angle fisheye cameras mounted at the front and rear bumpers of the vehicle. The respective field of view associated with the front and rear facing image sensors (114, 116) are denoted by the reference numerals 114a and 116a respectively. It will be appreciated by a person skilled in the art that other types and numbers of image sensors may also be used in the image sensor module 112. The environment module 110 may also include other types of environment sensors such as a radar sensor module (118), lidar, ultrasonic sensors (not shown).

The machine vision module 120 is in communication with the environment module 110 and is configured to perform an automated method for detecting the presence of emergency vehicles by processing and analysing a plurality of image frames taken by one or more image sensors in the image sensor module 112 over a period of time. For instance, the image sensor module 112 may continuously send image frames captured by the image sensors to the machine vision module for detection of emergency vehicles or only send images on an as-demanded basis. The machine vision module 120 comprises a computing processor 122 and a hardware memory 124 in communication with the processor 122. The computing processor 112 may, for example, be a microcontroller or graphics processing units (GPU) capable of accessing the memory 124 to store information and execute instructions stored therein. Alternatively, the processor 122 and memory 124 may also be integrated on a single integrated circuit. The memory 124 stores information accessible by the processor 122 such as instructions executable by the processor 122 and data which may be stored, retrieved or otherwise used by the processor 122. For example, the processor 122 may execute a method for detecting the presence of emergency vehicles according to some implementations of this disclosure based on instructions stored in the memory 124. Such method may include determining an EV colour component for a plurality of pixels in each image frame of a plurality of image frames taken by an image sensor over a period of time. Preferably, the EV colour component is computed for all the pixels in each of the plurality of image frames. The EV colour component refers to the proportion of a first colour associated with one or more types of emergency vehicles in a pixel relative to the total colour component in the pixel. Examples of emergency vehicles include police cars, ambulances and fire trucks. By way of example, the first colour may be blue and it may be associated with ambulances and police cars. A pixel is assigned a first value if the EV colour component for that pixel exceeds a predefined threshold value and a second value if the EV colour component does not. The first value may for example, be 1 and the second value 0. Other values may also be suitable so long as the first and second values are different. In some implementations, data stored in the memory 124 may include EV colour component predefined threshold value(s) for one or more types of emergency vehicles. An EV colour value associated with the first colour may then be calculated for each image frame based on the sum of all the first values for that frame. The memory 124 may be used as a temporary buffer for storing EV colour component and EV colour values. A time domain representation of EV colour value versus time is then generated for the plurality of image frames by plotting the EV colour value of each image frame against the time when the image frame was captured. The processor may then determine if any light sources with the first colour and flashing at a rate matching those of an emergency vehicle is present in the plurality of image frames by converting the time representation to a frequency spectrum. The frequency spectrum is then compared with known frequency spectrums of emergency vehicles having emergency lights of the first colour to see if there is a match. In one implementation, a comparison is made between the frequency components in the frequency spectrum and known frequency spectrums of emergency vehicles. The frequency components being compared may include at least the fundamental frequency and one or more harmonics. The frequency spectrum signatures of emergency vehicles may be stored in memory 124 and retrieved therefrom by the processor 122 for comparison.

Although FIG. 1 functionally illustrates the processor 122 and memory 124 as being located within the same block, it will be appreciated by an ordinary person skilled in the art that the processor and memory may actually comprise multiple processors and/or memories located in different housing. Accordingly, references to a processor or memory will be understood to include references to a collection of processors and/or memories that operate to perform the functions of the machine vision module described in this disclosure. Further, it will be appreciated by a person skilled in the art that the machine vision module may exist independently of other modules or components. Alternatively, it may also be a shared element or process of other modules, programs or hardware. Although the implementations illustrated in FIGS. 1 and 3 shows the machine vision module and image sensors as being associated with a vehicle, this is not intended to be limiting. For example, the present disclosure may be used to detect emergency vehicles based on image frames captured by one or more image sensors mounted on a building or lamp post and the processor may be configured to alert vehicles in the proximity of the image sensor about the presence of an emergency vehicle when one is detected.

The system 100 also comprises an autonomous driving module 140, a user interface 160 and a telematics module 180 in communication with the machine vision module 120. By way of example, the machine vision module 120 may be communicatively coupled to the other modules via a controller area network (CAN) bus. The autonomous driving module 160 is responsible for controlling the vehicle's semi-autonomous and autonomous driving functions such as adaptive cruise control (ACC), active lane assist, highly automated driving (HAD) and park assist. It typically comprises a supervisory electronic control unit (ECU) which plans, co-ordinates and executes the various semi-autonomous and autonomous driving functions by receiving data/instructions from various vehicle modules, analysing them and sending instructions to for example, a powertrain, steering and braking module in order to effect the desired vehicle manoeuvre. As for the user interface 160 associated with the vehicle, it may be used for communicating audio and visual messages to a driver of the vehicle. In one variation, the user interface 160 may comprise components such as an instrument panel, an electronic display and an audio system. The instrument panel may be a dashboard or a centre display which displays for example, a speedometer, tachometer and warning light indicators. The user interface may also comprise an electronic display such as an infotainment or heads-up display for communicating other visual messages to the driver and an audio system for playing audio messages, warning or music. As for the telematics module 180 it is operable to carry out communications between the ego vehicle and other vehicles, that is, vehicle-to-vehicle (V2V) communications. The telematics module 180 may also be operable to allow for vehicle-to-infrastructure (V2I) communication. In some implementations of this disclosure, the processor 122 in the machine vision module 120 may also cause one or more actions to be executed at least partially in response to detecting that one or more light sources associated with one or more types of emergency vehicles is present. These actions may include causing a notification to be issued to the driver that there is an emergency vehicle in his proximity and be should take appropriate action to give way to the emergency vehicle. The notification may be displayed and/or aurally communicated to the driver via the HUD 162 and/or audio system 164 in the user interface 160. The processor 122 may also send a signal to the autonomous driving module 140 instructing it to take over control of the vehicle and manoeuvre the vehicle such that it yields to the emergency vehicle. In yet another variation, the one or more actions may also include sending signals to other vehicles in the proximity via the telematics module 180 so as to alert them about the presence of an emergency vehicle.

Figure 3A:
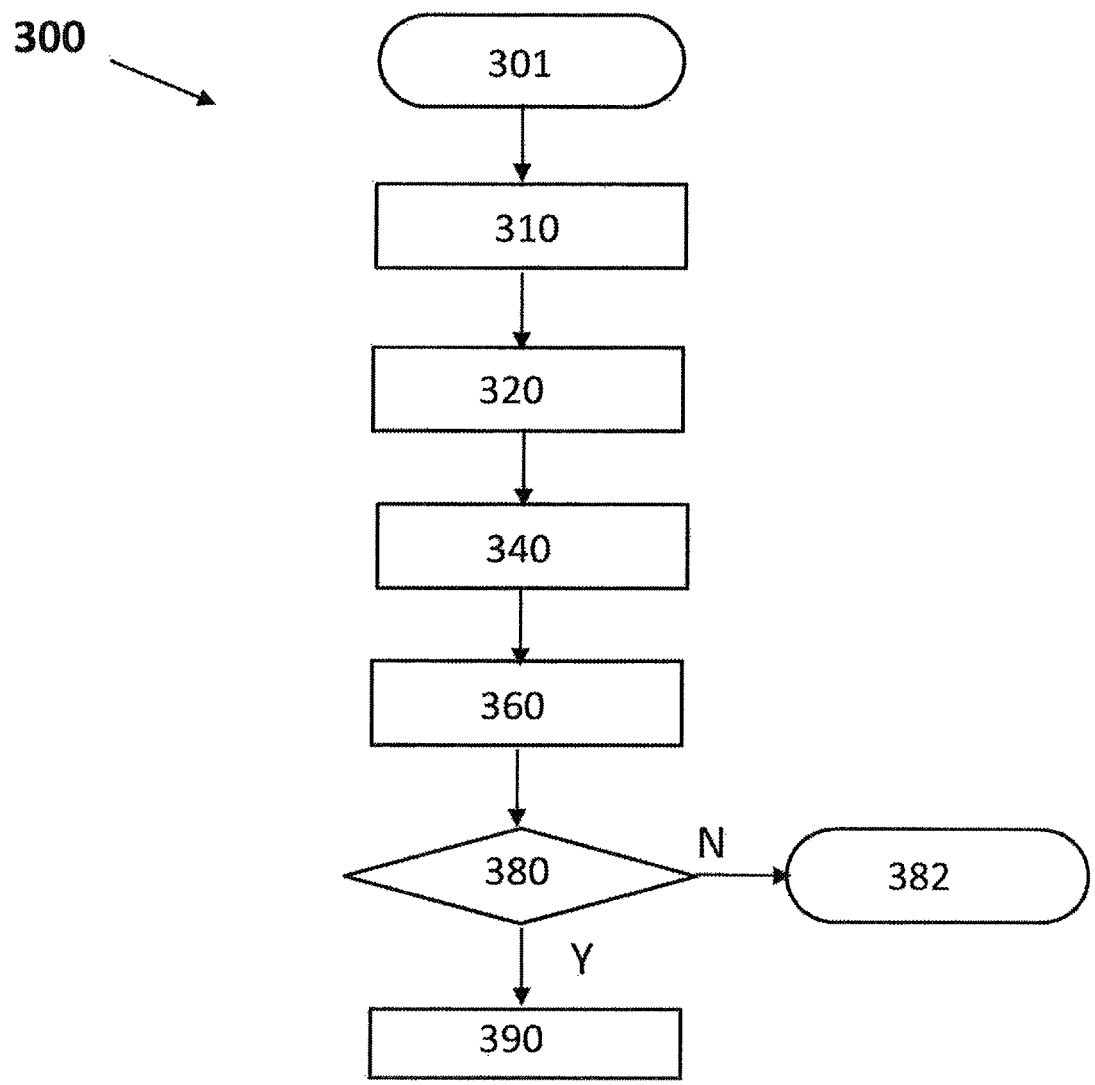
FIG. 3A is a flow diagram illustrating a method for detecting the presence of emergency vehicles according to one implementation of this disclosure.

FIG. 3A is a flowchart illustrating an exemplary process 300 for detecting the presence of one or more types of emergency vehicle having a flashing light source of a first colour in accordance one implementation of this disclosure. The process 300 may be executed sequentially or in parallel with other implementations of this disclosure for detecting emergency vehicles having flashing light sources of other colours. For instance, some countries such as the US may use blue lights sources on ambulances and law enforcement vehicles such as police cars, and red light sources for fire engines. As such, two processes may be executed in contemporaneously or sequentially to detect for the presence of emergency vehicles with blue or red flashing lights. The operations of the process 300 will be described with reference to the system in FIG. 1. However, it will be appreciated that other similar systems may also be suitable. The process starts at step 301 and may be initiated upon the ignition of a vehicle being switched on. Other events for initiating the start of the process 300 may also be suitable and the process may also be initiated on demand. In step 310, starting of the process in block 301 causes the processor 122 in the machine vision module 120 to start receiving a first block of image frames comprising a plurality of image frames taken by an image sensor over a period of time, t. The image sensor may, for example, be an image sensor 116 mounted at the rear of the vehicle like in FIG. 2. In this disclosure, the presence of emergency vehicles is detected by analysing image frames in blocks each comprising a plurality of image frames taken by an image sensor over a period of time, t. In one implementation, each block of image frames comprises a total of 64 image frames taken by an image sensor over a period of 4 seconds at a rate of 16 image frames per second. The processor 122 processes the plurality of image frames in each block for example using the methods in steps 320-380 in FIG. 3A to determine if any light source(s) associated with one or more particular types of emergency vehicles is present in a block. A different number of image frames and duration over which the image frames are captured may also be suitable so long as the frame rate (number of frames per second) and timing is suitable for detecting flashing light sources associated with emergency vehicles of interest.

Figure 3B:
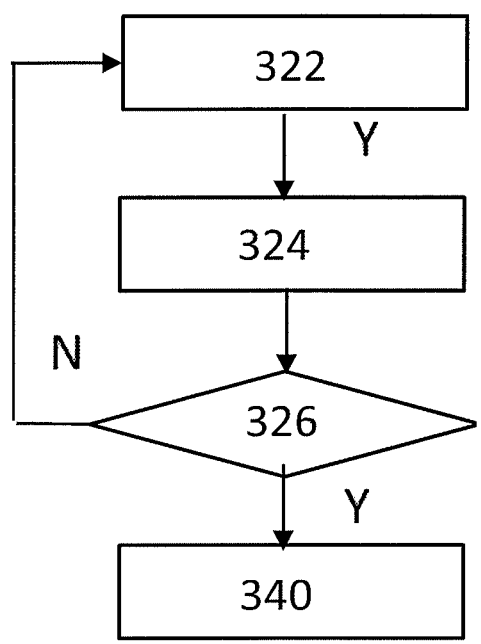
FIG. 3B is a flow diagram illustrating an exemplary method for determining the EV colour value for each of a plurality of image frames according to one implementation of this disclosure.

In block 320, the processor 122 determines for each of the plurality of image frames received by the processor, the EV colour value for a first colour associated with one or more types of emergency vehicles. For purposes of illustration, we will assume that the method 300 is used to emergency vehicles having blue flashing lights. That is, the first colour is blue. However, it is to be appreciated that this disclosure can also be deployed for the detection of flashing light sources of other colours. An exemplary detailed illustration of the steps for determining the EV colour value for each of the plurality of image frames in a block is shown in FIG. 3B. At step 322, the processor 122 determines for an image frame, the EV colour component for a pixel in the image frame and assigns to the pixel a first value if the EV colour component exceeds a predefined threshold value and a second value if it does not. Preferably, the first value is 1 and the second value is 0. The same process is then repeated for a plurality of pixels in the image frame. The EV colour component is determined by calculating the ratio of the first colour in a pixel relative to the total colour in the pixel. For instance, if the image sensor is a photographic digital camera that uses a Bayer filter arrangement where the colours are described in terms of green, blue and red, and the total colour in an image frame is G1|B|G2|R, then the EV colour component for a pixel may be determined using the formula $$\frac{\text{first colour}}{G1 + G2 + B + R}$$

where the first colour may be a primary colour such as blue, green or red, or a secondary colour composed of two or more primary colours. In implementations where the first colour is a secondary colour, the first colour is expressed in terms of the primary colour components. For instance, if the first colour is yellow, the first colour will be red+green. Therefore, if the method 300 is used to detect emergency vehicle lights which are blue in colour, then the formula for determining the EV colour component for each pixel will be $$\frac{B}{G1 + G2 + B + R}$$

As for the setting of predefined threshold values which determine whether an EV colour component of first or second value should be assigned to a pixel, this will depend on factors such as the type of image sensor being used, sensitivity of the image sensor and image processing techniques applied to image frames. In some implementations, predefined threshold values may be selected empirically by observing the variation in detection distance and other detection performance related parameters against predefined threshold values. For instance, the inventors have found that for the detection of emergency vehicles with blue flashing lights, a predefined threshold value of 0.3 is preferred for better detection performance when images are taken from image sensors using Bayer filter arrangements while a value of 0.4 is better for images originating from image sensors which use demonsaicing algorithms. The values of 0.3 and 0.4 are not intended to be limiting and other predefined threshold values may also be suitable.

In one implementation, the EV colour component of all the pixels in each image frame is calculated and a first or second value is assigned to a pixel depending on whether the EV colour component exceeds a predefined threshold value. For instance, if an image frame comprises m×n number of pixels and the first and second values are 1 and 0 respectively, we will obtain a matrix of m×n in size which is populated with values of either 1 or 0. In other implementations, the EV colour component may only be computed for a selection of pixels in an image frame. For example, the EV colour component may be calculated for every alternate pixel. Computing the EV colour component for only a selection of pixels in an image frame has the advantage of reducing computational processing time and demands. However, the number of pixels chosen in the selection should be sufficient to enable the detection of first colour flashing light sources belonging to emergency vehicles of interest.

In step 324, the EV colour value for an image frame is determined by calculating the sum of all the first values in the image frame. The EV colour value gives an indication of the first colour content in an image frame. For instance, if the first colour is blue, the EV colour value gives an indication of the blueness measurement for that image frame. In some implementations, a median filter may be used to remove salt and pepper noise such as spurious spikes due to hard thresholding from an image frame after the EV colour component for all the pixels in an image frame have been computed but before the calculation of EV colour value. The process then goes on to decision step 326 which checks if the EV colour value for all the image frames in a block have been computed. If the answer is no, the process goes back to step 322 and retrieves another frame from the current block and repeats steps 322-326. If the answer is yes, that is the number of image frames processed equals to the total number of image frames in the current block of image frames being processed then the method goes on to step 340.

Figure 4:
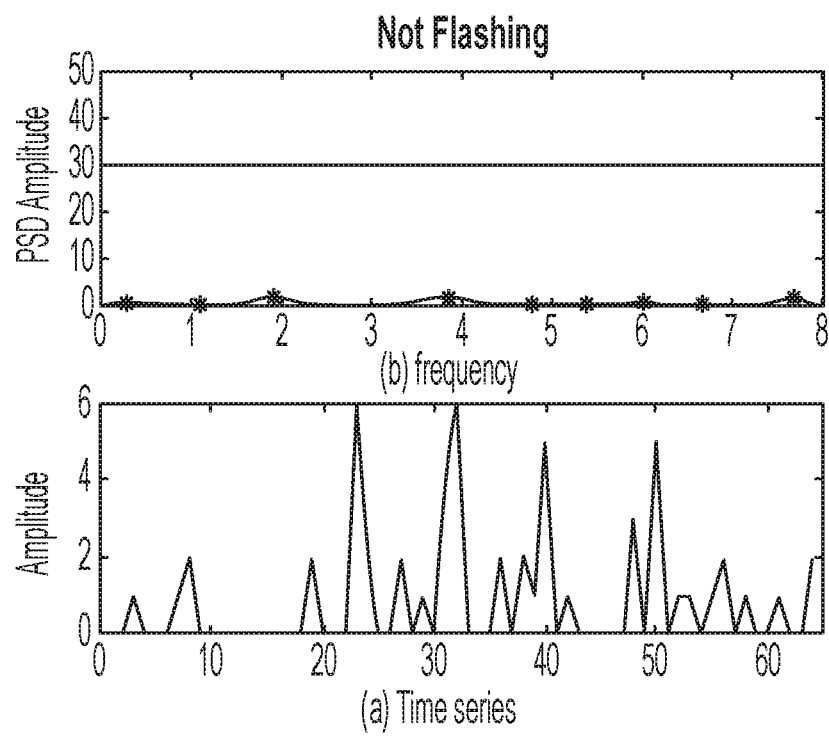
FIG. 4 shows an exemplary time domain representation and corresponding frequency spectrum when no flashing light sources associated with emergency vehicles of interest is detected.
Figure 5:
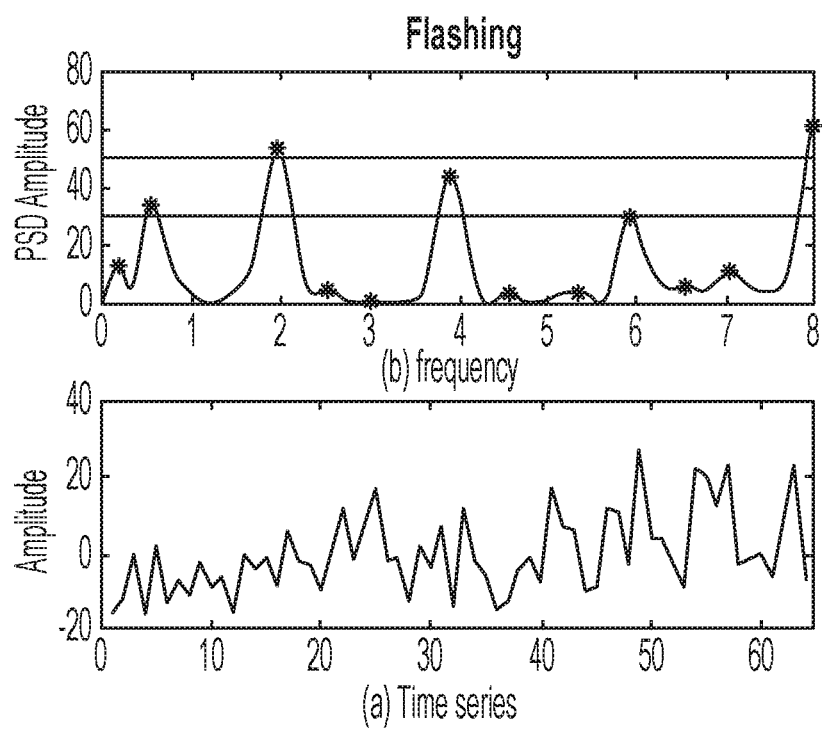
FIG. 5 shows an exemplary time domain representation and corresponding frequency spectrum when a flashing blue coloured light source associated with one or more types of emergency vehicle is detected.

In step 340, a time domain representation is generated based on the EV colour values associated with the plurality of image frames in the block. This is done by plotting the EV colour value for each image frame against the timing of the image frame in the block. In some implementations, the EV colour value for the plurality of image frames (e.g. 64 images frames) may be stored in a temporary buffer such as a circular buffer located in the memory 124 of the machine vision module. The EV colour values are then retrieved from the buffer and used to generate the time domain representation. In some implementations, the generation of a time domain representation may include process steps for removing any direct current (d.c.) bias in the EV colour values. This may be accomplished by deducting the average EV colour value for all the image frames in a block from the individual EV colour values of each image frame. The time domain representation is then created based on the d.c. bias adjusted EV colour values. Graphs (a) of FIG. 4 and FIG. 5 are exemplary time domain representations illustrating the variation in d.c. bias adjusted EV colour value versus time. In both the FIGS. 4(a) and 5(a) graphs, time is set to zero at the start of a block of image frames.

In step 360, the processor converts the time domain representation generated in step 340 to a frequency spectrum. Unlike a time domain representation which looks at how a signal changes with time, a frequency spectrum shows how much of a signal (that is, in the present context the EV colour value associated with the plurality of image frames) lies within each given frequency band over a range of frequencies. As discussed earlier, EV colour value gives an indication of the first colour content in an image frame. Therefore, if there are blue light sources which are flashing at the same rate as emergency vehicles of interest, the blue EV colour value for the plurality of image frames in a block should flash at the same rate as the relevant emergency vehicles. That is, the frequency spectrum associated with the blue EV colour value should match that of flashing light sources found on emergency vehicles of interest. In some implementations, a Fourier transform may be used to convert the time domain representation into a frequency spectrum. However, other types of mathematical transforms which are suitable for converting a signal from a time to frequency domain such as wavelet transform may also be used. For frequency spectrums derived using Fourier transform, the frequency components are represented as sinusoidal waves with its own amplitude and phase. In one implementation, a 256-point fast Fourier transform (FFT) may be used to convert the time domain representation to a frequency spectrum. FFT is generally faster compared to discrete Fourier transformation and gives the same results. Relatively fewer data points are also required to obtain a smooth frequency response. Prior to applying the FFT algorithm, the time domain signal may be smoothed such as by using the hamming window algorithm in the MATLAB™ software. In some variations, it may be desirable to have a resulting frequency spectrum which is one-sided spectrum and this can be obtained by using the known pwelch function in the MATLAB™ software. Since this disclosure only requires the absolute value of signals in the frequency spectrum to detect flashing light sources, one-sided spectrums advantageously eliminate redundant computations associated with two sided spectrums because both sides of the spectrum have the same requisite information. Additionally, the elimination of redundant computations also allows more relevant sampling points to be processed without incurring additional computational resources. Graphs (b) in FIGS. 4 and 5 show illustrative examples of frequency spectrums converted from a time domain representation in graphs (a) of FIGS. 4 and 5 respectively. In both FIGS. 4(b) and 5(b), the frequency spectrum is represented as a variation in power spectral density (PSD) versus frequency. In other implementations, a normalized frequency spectrum which shows the relative contribution of a frequency component with respect to all the frequency components in a signal may also be generated instead. This may be achieved by normalizing the peak amplitudes of a PSD signal with respect to the sum of all the available peaks in the signal. For instance, if a frequency component has a normalized peak value of 0.3, this means that that frequency component contributes to 30% of the total frequency component.

The method then proceeds onto decision step 380 where the processor 122 determines by analysing the frequency spectrum if there are any flashing light sources of the first colour associated with one or more types of emergency vehicles present in the image frames. In some implementations, this comprises determining if the frequency components present in the frequency spectrum matches the frequency components of known flashing first colour light sources belonging to one or more types of emergency vehicle. For instance, if the first colour is blue then the processor checks if it matches any known frequency spectrum of one or more types of emergency vehicle equipped with flashing blue light. The comparison of frequency spectrum eliminates flashing light sources of the first colour which are unrelated to emergency vehicles of interest such as advertising signs. The known frequency spectrums of emergency vehicles may be stored in a memory 124 located within the machine vision module 120 or on a remote server and retrieved by the processor for comparison. A frequency component may be considered as being present in a frequency spectrum if the amplitude of the frequency component is greater than or equal to predefined minimum amplitude limit. In some implementations, the frequency spectrum is said to match that of a known emergency vehicle light source of the same colour if at least the fundamental frequency and one or more harmonics correspond.

If the processor determines at step 380 that no flashing light sources associated with emergency vehicles of interest are present in the image frames, the process goes to step 382 where the method 300 ends. FIG. 4 shows the corresponding time domain representation and frequency spectrum for an exemplary scenario where the method 300 has been deployed to detect flashing blue light belonging to one or more types of emergency vehicles in a block of images and none were detected. The time domain representation in FIG. 4(*a*) shows the EV colour values of the image frames plotted against the timing of the image frames. The EV colour values shown in FIG. 4(*a*) are d.c. bias adjusted and time=0 indicates the beginning of the block of frames. The power spectral density (PSD) versus frequency graph in FIG. 4(*b*) is the corresponding frequency spectrum converted from the time domain representation in FIG. 4(*a*). In this example, the predefined minimum amplitude for acknowledging the presence of a frequency component is 20 Watts/Hz. Therefore, since the FIG. 4(*b*) frequency spectrum does not contain any spectral peaks with an amplitude greater than 20 Watts/Hz within the frequencies of interest, there are no flashing blue lights present in the image frames. On the other hand, if the processor determines at step 380 that there is at least one light source associated with a particular type of emergency vehicle present in the image frames, then the process goes on to step 390. FIG. 5 shows another exemplary set of time domain representation (FIG. 5(*a*)) and frequency spectrum (FIG. 5(*b*)) obtained by applying method 300 to detect flashing blue light belonging to emergency vehicles. In this example, the frequency spectrum is similarly represented as a variation in power spectral density (PSD) versus frequency. The frequency spectrum in FIG. 5(*b*) contains flashing blue light as there are frequency components at 2, 4, 6 and 8 Hz exceeding 20 Watts/Hz. Any signals having a frequency less than 1.5 Hz are ignored as they are considered as a d.c. components that do not form part of a flashing light source. In FIG. 5(*b*), the frequency component or peak at 2 Hz is the fundamental frequency and while the 4, 6 and 8 Hz peaks are the respective first, second and third harmonics associated with the 2 Hz fundamental frequency. Fundamental frequency is defined as the lowest frequency sinusoidal in a frequency spectrum. A flashing blue light source associated with an emergency vehicle of interest is said to be present in the FIG. 5 image frames if the frequency components in the FIG. 5(*b*) spectrum matches the frequency component of a known first colour light source belonging to one or more types of emergency vehicles. In some implementations, the frequency components are considered as matching if the fundamental frequency and one or more harmonics match.

At step 390, the processor 122 causes one or more actions to be executed at least partially in response to detecting at least one light source associated with a particular type of emergency vehicle in step 380. That is, the processor may take the one or more actions just based on detection of at least one relevant light source or check for the presence of other conditions before deciding which actions to take. In some implementations, the one or more actions may comprise identifying the location any emergency vehicles being detected. By way of example, this may comprise activating one or more environment sensors to identify the location of one or more emergency vehicles detected and/or analysing data from one or more environment sensors for the same purpose. If the emergency vehicle is identified to be within a certain proximity to the ego vehicle the processor may also cause a visual and/or aural notification to be issued to the driver of the ego vehicle. The notification may also inform the driver to take appropriate action to give way to the emergency vehicle. The notification may be issued via the HUD display 162 and/or audio system 164 in the user interface 160. Other user interface such as an infotainment system display or wearables such as Google™ glasses may also be used for communication. The processor 122 may also send a signal to the autonomous driving module 140 instructing it to take over control of the vehicle and manoeuvre the vehicle such that it yields to the emergency vehicle being detected if the emergency vehicle is identified to be within a certain proximity to the ego vehicle. For instance, the autonomous driving module 140 may cause the vehicle to slow down, steer the vehicle such that it yields to the emergency vehicle being detected. The autonomous driving module 140 may also instruct a signalling system of the vehicle to activate the relevant signalling lights indicating the vehicle's intention to other road users. In yet another variation, the one or more actions may include instructing the telematics module 180 to send signals to other vehicles in the proximity alerting them about the presence of an emergency vehicle.

Therefore, the presence of light sources associated with emergency vehicles is detected by calculating the EV colour component for a representative plurality of pixels in an image frame and adding all the first values derived therefrom in order to obtain the EV colour value of an image frame. The EV colour value gives an indication of the colour intensity for a chosen first colour being analysed in a given frame. Going back to the example where the first colour is blue, this gives us an indication of the blueness value of an image frame. In order to determine if there are any flashing first colour light sources matching that of an emergency vehicle, the EV colour value for all image frames in a block of frames is calculated and a time domain representation derived therefrom. The time domain representation is then converted to a frequency spectrum and analysed. For instance, it may be compared with known frequency spectrums of one or more types of emergency vehicles in order to determine if any first colour light sources present flashing at the same rate as a known emergency vehicle. Therefore, implementations of this disclosure do not require image frames to be analysed and light sources corresponding to potential emergency vehicles identified based on templates of known emergency vehicles stored in a database. Such templates including characteristics such as colour and spatial configuration. It also does not require determining individually if the flashing rate of each potential light source being identified matches the flashing rate of known emergency vehicles stored in the database. Instead, the EV colour value of each of a plurality of image frames taken by an image sensor over a period of time is computed and a frequency spectrum derived therefrom is used to identify if there are any light sources of a first colour and having a flashing rate associated with one or more types of emergency vehicles. This advantageously reduces the computational requirements compared to which require image processing steps to specifically identify light sources belonging to potential emergency vehicles as part of the emergency vehicle detection process.

While various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular implementations only, and is not intended to be limiting.

What is claimed is:

1. A method for detecting the presence of an emergency vehicle (EV) comprising:
    receiving a plurality of image frames taken by an image sensor over a period of time, the image frames including a plurality of pixels, each pixel being associated with a total colour;
    determining an EV colour component for each of the plurality of pixels in each image frame, the EV colour component being determined based on a ratio of a first colour relative to the total colour;
    assigning to each pixel a first value if the EV colour component exceeds a predefined threshold value and a second value if the EV colour component does not exceed the predefined threshold value;
    determining for each of the plurality of image frames, an EV colour value for the first colour based on the sum of all of the first values for each image frame;
    generating a time domain representation based on the EV colour values associated with the plurality of image frames;
    converting the time domain representation for the plurality of image frames to a frequency spectrum; and
    determining if any flashing light sources of the first colour associated with one or more types of emergency vehicles is present by analysing the frequency spectrum.

2. The method of claim 1, wherein the first value is 1 and the second value is 0 and further comprising removing spurious spikes using a median filter after determining the EV colour component for the plurality of pixels in each of the plurality of image frames and before determining the EV colour value.

3. The method according to claim 2, wherein generating the time domain representation of the plurality of image frames further comprises removing any dc bias in the EV colour values.

4. The method according to claim 1, wherein generating the time domain representation of the plurality of image frames further comprises removing any dc bias in the EV colour values.

5. The method according to claim 1 wherein converting the time domain representation to the frequency spectrum comprises applying fast Fourier transform to the time domain representation.

6. The method according to claim 1 wherein the frequency spectrum is a one-sided frequency spectrum.

7. The method according to claim 1 wherein analysing the frequency spectrum comprises determining if frequency components present in the frequency spectrum matches frequency components of known first colour light sources belonging to one or more types of emergency vehicles.

8. The method according to claim 7 wherein the frequency components present in the frequency spectrum are considered as matching frequency components of a known first colour light source associated with one or more types of emergency vehicles if at least the fundamental frequency and one or more harmonics match.

9. The method according to claim 1 further comprising causing one or more actions to be executed based at least in part upon determining that at least one light source associated with a particular type of emergency vehicle is present.

10. The method of claim 9, wherein the one or more actions comprises determining a location of one or more emergency vehicles detected to be present.

11. A non-transitory computer-readable storage medium comprising computer-readable instructions for carrying out the method according to claim 1.

12. A device for detecting the presence of emergency vehicles (EVs) comprising:
    a processor; and
    at least one memory coupled to the processor and storing instructions executable
    by the
    processor causing the processor to:
    receive a plurality of image frames taken by an image sensor over a period of time, the image frames including a plurality of pixels, each pixel being associate with a total colour;
    determine an EV colour component for each of the plurality of pixels in each image frame; the EV colour component being determined based on a ratio of a first colour relative to the total;
    assign to each pixel a first value if the EV colour component exceeds a predefined threshold value and a second value if the EV colour component does not exceed the predefined threshold value;
    determine for each of the plurality of image frames an EV colour value for the first colour based on the sum of all of the first values for each image frame; generate a time domain representation based on the EV colour values associated with the plurality of image frames;
    convert the time domain representation for the plurality of image frames to a frequency spectrum; and
    determine if any flashing light sources of the first colour associated with one or more types of emergency vehicles is present by analysing the frequency spectrum.

13. The device according to claim 12, wherein the first value is 1 and the second value is 0 and wherein the at least one memory further causes the processor to remove spurious spikes using a median filter after determining the EV colour component for the plurality of pixels in each of the plurality of image frames and before determining the EV colour value.

14. The device according to claim 13, wherein analysing the frequency spectrum comprises determining if frequency components present in the frequency spectrum matches frequency components of known first colour light sources associated with one or more types of emergency vehicles.

15. The device according to claim 12, wherein analysing the frequency spectrum comprises determining if frequency components present in the frequency spectrum matches frequency components of known first colour light sources associated with one or more types of emergency vehicles.

16. The device according to claim 15 wherein the frequency components present in the frequency spectrum are considered as matching frequency components of a known first colour light source associated with one or more types of emergency vehicles if at least the fundamental frequency and one or more harmonics match.

17. The device according to claim 12, wherein the at least one memory further causes the processor to:
   cause one or more actions to be executed based at least in part upon determining that at least one light source associated with a particular type of emergency vehicle is present.

18. A vehicle comprising device for detecting the presence of an emergency vehicle according to claim 12.

* * * * *